United States Patent [19]
Milunas et al.

[11] Patent Number: 5,119,695
[45] Date of Patent: Jun. 9, 1992

[54] OPEN-LOOP CLUTCH-TO-CLUTCH UPSHIFT CONTROL HAVING CLUTCH OVERLAP REGULATION

[75] Inventors: Rimas S. Milunas, Royal Oak; Larry T. Nitz, Troy, both of Mich.

[73] Assignee: Saturn Corporation, Troy, Mich.

[21] Appl. No.: 722,711

[22] Filed: Jun. 27, 1991

[51] Int. Cl.⁵ .............................................. B60K 41/18
[52] U.S. Cl. ........................................ 74/866; 74/867
[58] Field of Search ............... 74/866, 867; 364/424.1

[56] References Cited

U.S. PATENT DOCUMENTS

| | | | |
|---|---|---|---|
| 4,044,634 | 8/1977 | Florus et al. | 74/866 |
| 4,796,490 | 1/1989 | Butts et al. | 74/866 |
| 4,807,497 | 2/1989 | Yasue et al. | 74/866 X |
| 5,046,174 | 9/1991 | Lentz et al. | 74/866 X |
| 5,046,383 | 9/1991 | Botts et al. | 74/866 X |
| 5,070,746 | 12/1991 | Milunas et al. | 74/866 |
| 5,070,747 | 12/1991 | Lentz et al. | 74/866 |

*Primary Examiner*—Leslie A. Braun
*Assistant Examiner*—Daniel Wittels
*Attorney, Agent, or Firm*—Mark A. Navarre

[57] ABSTRACT

An open-loop clutch-to-clutch shift control system wherein the overlap between off-going and on-coming clutches in an upshift is regulated in accordance with a confidence term determined through a self-estimation by the control system of its ability to accurately determine the on-coming clutch fill time, and thus, its ability to effect a precise exchange of the off-going and on-coming clutches with little or no overlap. Under certain conditions, the confidence level is assumed to be low, and the clutches are controlled to result in a relatively high level of overlap. As the level of confidence improves, the timing of the clutch exchange is adjusted to reduce the level of overlap. When the level of confidence is high, the exchange of clutches is effected with almost no overlap.

14 Claims, 15 Drawing Sheets

OPEN-LOOP CLUTCH-TO-CLUTCH UPSHIFT CONTROL HAVING CLUTCH OVERLAP REGULATION

This invention relates to an open-loop control method for clutch-to-clutch power-on upshifting of a motor vehicle automatic transmission, and more particularly, to a control of clutch overlap based on an estimation of the level of control confidence.

BACKGROUND OF THE INVENTION

Clutch-to-clutch upshifting in an automatic transmission involves an exchange of on-coming and off-going fluid operated friction elements (clutches), and is generally characterized as comprising three successive phases: a fill phase, a torque phase and an inertia phase. In the fill phase, the on-coming clutch is filled in preparation for torque transmission; in the torque phase, the torque exchange occurs without a corresponding speed change; and in the inertia phase, the speed change occurs.

The conventional method of performing open-loop clutch-to-clutch upshifting involves progressively increasing the fluid pressure supplied to the on-coming clutch while progressively releasing the fluid pressure applied to the off-going clutch. This results in a certain level of overlap during which both on-coming and off-going clutches are partially engaged. While the overlap is not particularly desirable from the standpoint of shift quality since the unnecessary torque capacity of the off-going clutch directly reduces the transmission output torque, it does serve to prevent engine flare if the torque capacity of the on-coming clutch is delayed due to underfilling of the on-coming clutch. Overfilling of the on-coming clutch causes a further reduction of the transmission output torque.

However, if the duration of the on-coming clutch fill period can be accurately determined in advance of the shift, the off-going clutch can be released just as the on-coming clutch develops torque capacity, permitting a smooth exchange of torque from the off-going clutch to the on-coming clutch with almost no overlap. This minimizes the transmission output torque disturbance in two ways: (1) it minimizes the output torque reduction during the torque phase and (2) it minimizes the duration of the torque phase so that the torque disturbance does not significantly excite the vehicle drivetrain components.

Nevertheless, there is a certain amount of variability due to manufacturing tolerances, temperature, wear and so on, that limits the ability of the control system to precisely estimate the on-coming clutch fill time under all conditions. This difficulty has been largely overcome through the use of adaptive control techniques which accurately learn the fill times (or fill volumes) of the various clutches over a number of shifts involving each clutch. A detailed example of such a system is set forth in the U.S. Patent to Downs et al. U.S. Pat. No. 4,707,789, issued Nov. 17, 1987, and assigned to General Motors Corporation.

In spite of the use of adaptive learning, it is difficult to compensate for certain types of variability (such as temperature-related variability), and convergence of the adaptively adjusted parameter (fill time) to its true value may only occur after a number of shifts to a particular speed ratio. This limits the ability of the control system to consistently achieve precise torque exchange between the off-going and on-coming clutches during the torque phase of a shift.

SUMMARY OF THE PRESENT INVENTION

The present invention is directed to an improved control method for an open-loop clutch-to-clutch shift control system wherein the overlap between off-going and on-coming clutches in an upshift is regulated in accordance with the level of control confidence. The confidence level may be thought of as a self-estimation by the control system of its ability to accurately determine the on-coming clutch fill time, and thus, its ability to effect a precise exchange of the off-going and on-coming clutches with little or no overlap.

Under certain conditions, such as loss of adaptive data, cold starting, and relatively large adaptive error, the confidence level is assumed to be low, and the clutches are controlled to result in a relatively high level of overlap. As the level of confidence improves, as deemed by temperature, the number of shifts and relatively low adaptive error, the timing of the clutch exchange is adjusted to reduce the level of overlap. When the level of confidence is high, the exchange of clutches is effected with almost no overlap.

In the preferred embodiment, the clutch overlap control is carried out by regulating the release of the off-going clutch in relation to the estimated confidence level. When the confidence level is relatively low, the release rate is relatively slow. When the confidence level is relatively high, the release rate is relatively fast. In an electronically controlled system, the regulation of the release rate may be carried out through linear pressure control, or as in the illustrated embodiment, by issuing a series of diminishing magnitude pressure commands to the off-going clutch.

With the control of this invention, clutch-to-clutch upshifting is carried out in an error tolerant way (relatively large overlap) when the control confidence is deemed to be low, and the shift quality progressively improves (progressively less overlap) as the sensed level of control confidence increases. This method thereby achieves shift quality consistent with the ability of the control system to accurately estimate the on-coming clutch fill time.

BRIEF DESCRIPTION OF THE DRAWINGS

FIG. 4 and 5 depict a no-overlap exchange of on-coming and off-going clutches, with and without fill error.

FIGS. 6 and 7 depict shifts carried out according to the teachings of this invention, at high and low confidence levels, respectively.

DETAILED DESCRIPTION OF THE DRAWINGS

Figure 1A:
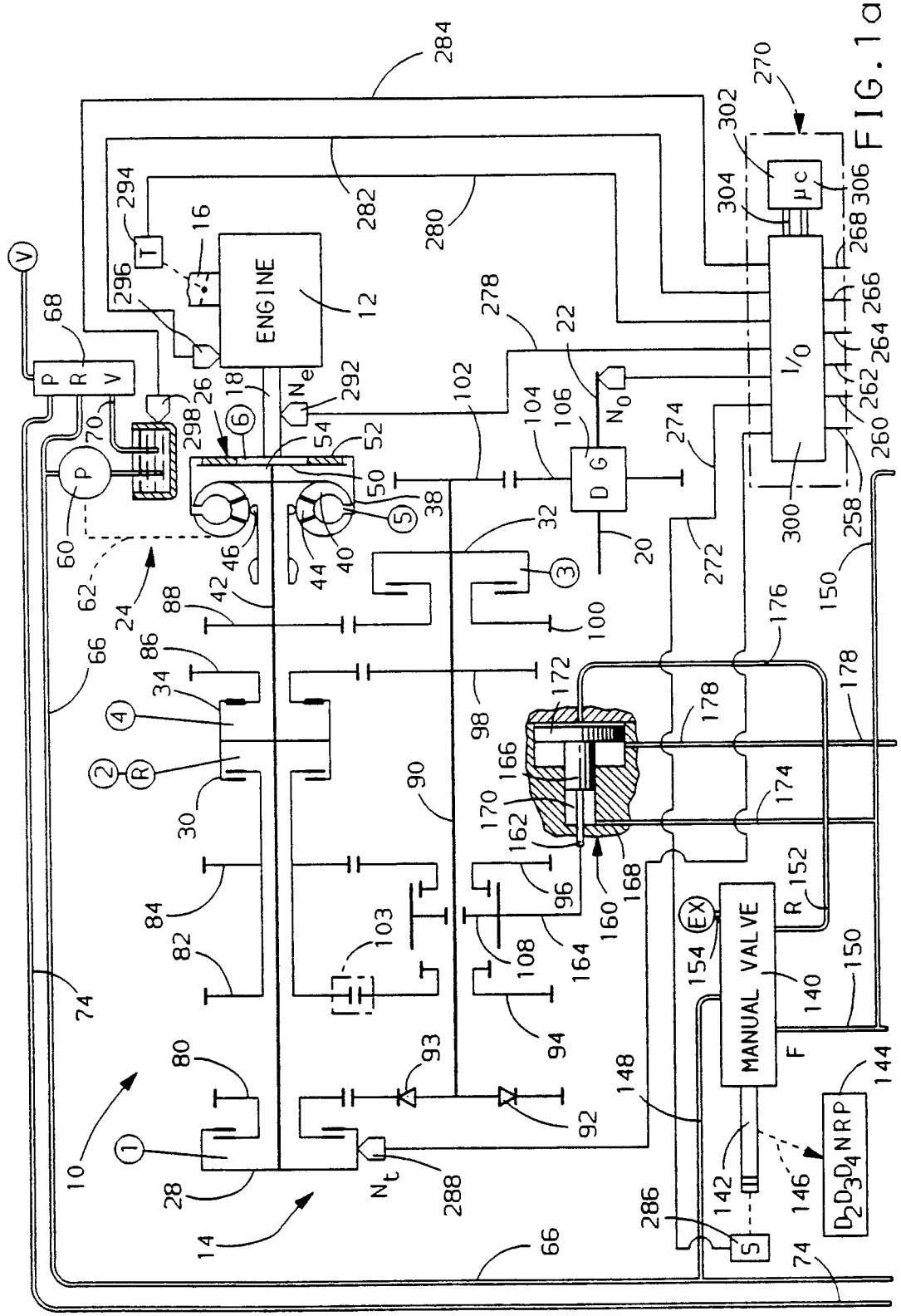
FIGS. 1a–1b schematically depict a computer-based electronic transmission control system controlled according to this invention.
Figure 1B:
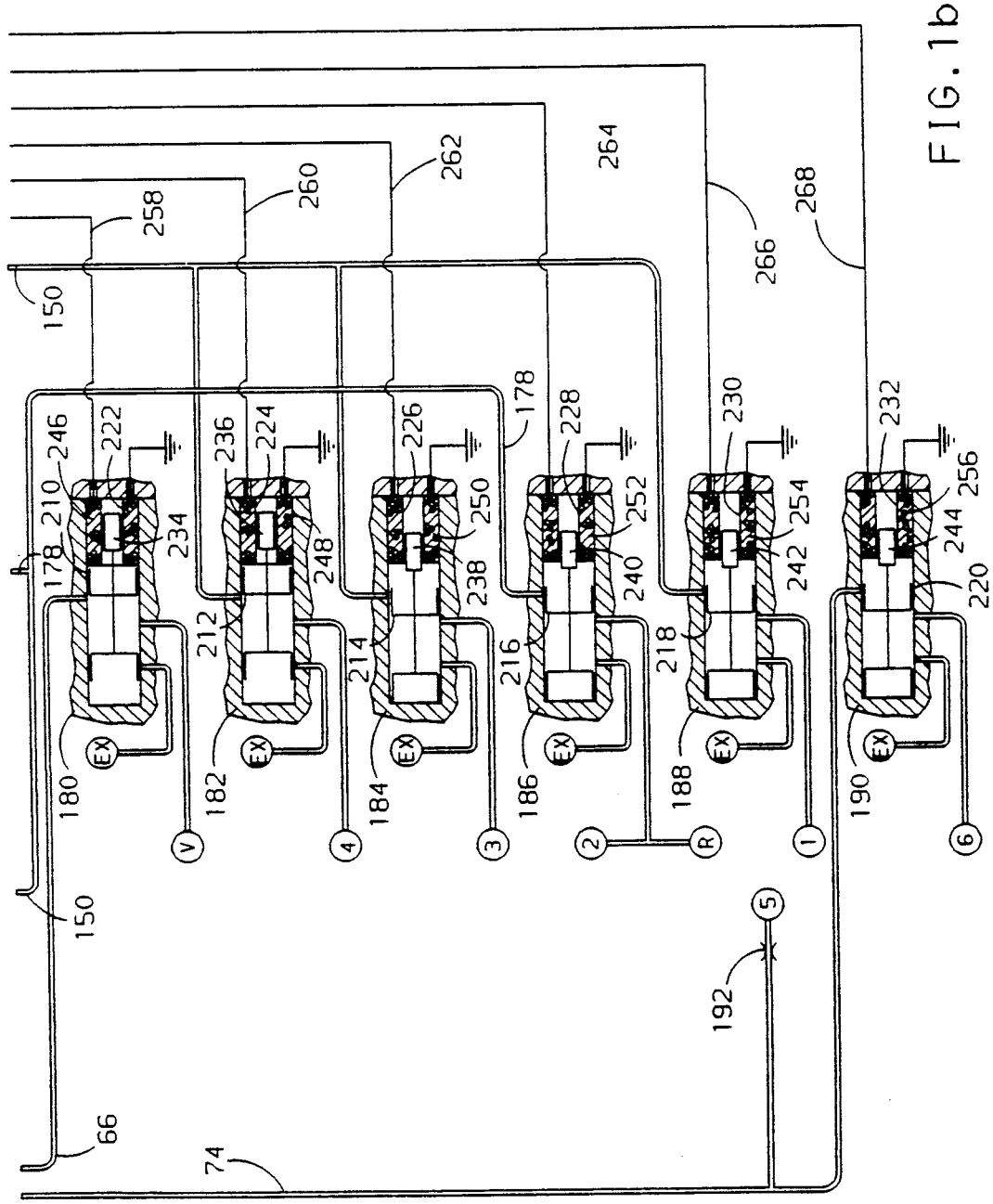

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18.

The transmission 14 transmits engine output torque to a pair of drive axles 20, 22 through a torque converter 24 and one or more of the fluid operated clutching devices 26-34, such clutching devices being applied or released according to a predetermined schedule for establishing the desired transmission speed ratio. The impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1a, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Patent to Schuster U.S. Pat. No. 4,342,545 issued Aug. 3, 1982, and a representative pressure regulator valve is disclosed in the U.S. Patent to Vukovich U.S. Pat. No. 4,283,970 issued Aug. 18, 1981, such patents being assigned to General Motors Corporation.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown).

Engagement of the clutching device is effected by supplying fluid pressure to an apply chamber thereof. The resulting torque capacity of the clutching device is a function of the applied pressure less the return spring pressure, hereinafter referred to as the working pressure pressure. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed Nt to output speed No. Representative Nt/No ratios for transmission 14 are as follows:

First—2.368
Second—1.273
Third—0.808
Fourth—0.585
Reverse—1.880

Shifting from a current forward speed ratio to a desired forward speed ratio requires that the clutching device associated with the current speed ratio (off-going) be disengaged, and the clutching device associated with the desired speed ratio (on-coming) be engaged. For example, a shift from the first forward speed ratio to the second forward speed ratio involves disengagement of the clutching device 28 and engagement of the clutching device 30.

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150.

When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172.

When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60, and are individually controlled to direct fluid pressure to the pressure regulator valve 68 or respective clutching devices 26–34. The fluid valve 180 receives line pressure directly from pump output line 66, and is controlled to direct a variable amount of such pressure to the pressure regulator valve 68, as indicated by the circled letter V. The fluid valves 182, 186 and 188 receive fluid pressure from the forward output line 150 of manual valve 140, and are controlled to direct variable amounts of such pressure to the clutching devices 34, 32 and 28, as indicated by the circled numerals 4, 3 and 1, respectively.

The fluid valve 186 receives fluid pressure from the forward output line 150 and the directional servo output line 178, and is controlled to direct a variable amount of such pressure to the clutching device 30, as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26, as indicated by the circled numeral 6. The apply chamber 54 of the clutching device 26 is supplied with fluid pressure from the output line 74 via the orifice 192, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1.

In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse-width-modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

While the fluid valves 180-190 have been illustrated as spool valves, other types of valves could be substituted therefor. By way of example, valves of the ball and seat type could be used. In general terms, the fluid valves 180-190 may be mechanized with any three-port pulse-width-modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed Nt; the speed transducer 290 senses the velocity of the drive axle 22 and therefore the transmission output speed No; and the speed transducer 292 senses the velocity of the engine output shaft 18 and therefore the engine speed Ne.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-285 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bi-directional data bus 306. Flow diagrams representing suitable program instructions for developing the pulse-width-modulation outputs are depicted in FIGS. 14-20.

As indicated above, every shift from one speed ratio to another involves disengagement of an off-going clutching device and engagement of an on-coming clutching device. Each shift includes a fill phase during which the apply chamber of the on-coming clutch is filled with fluid, a torque phase during which the engine torque is transferred from the off-going clutch to the on-coming clutch, and an inertia phase during which the speed change occurs.

In the illustrated embodiment, the control unit 270 supplies fluid to the on-coming clutch at relatively high pressure for a predetermined fill time, drops the pressure command to a first predetermined value, and then progressively increases the pressure to a second predetermined value over the torque and inertia phases to complete the shift.

Figure 2:
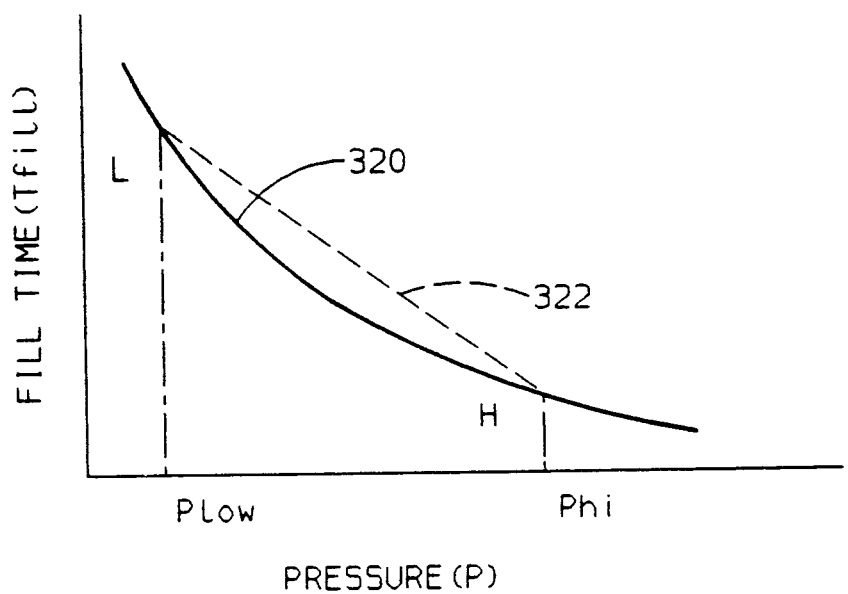
FIG. 2 graphically depicts an on-coming clutch fill time schedule utilized in the illustrated embodiment.

As set forth in the above-referenced Downs et al. patent, the base fill time for a given clutching device is determined primarily as a function of the requested line pressure, the geometry of the clutching device, and the viscosity of the fluid. Algebraically, the fill time Tfill is given as follows:

$$Tfill = V / [A^* (2P/r)^{\frac{1}{2}}]$$

where V is the volume of the apply chamber, A is the area of the clutch piston, P is the apply pressure less the return spring pressure, and r is the fluid viscosity. To improve the fill time calculation efficiency, the control unit 270 defines a fill time vs. pressure (P) function lookup table as graphically depicted by the trace 320 of FIG. 2. The trace 320 takes into account the clutching device geometry and is in the form of an inverse square root function due to the P dependence as set forth in the algebraic expression above. Rather than store the entire function, just the two fill time points (designated L and H) corresponding to the lowest and highest available line pressures PL and PH are stored by control unit 270. The fill time is linearly interpolated along the broken line 322 connecting the fill time points L and H, and then mathematically adjusted to reflect the inverse square root form (1//P) of the trace 320. The adjusted fill time is then modified by an oil temperature dependent factor to compensate for variations in the fluid viscosity.

The above-described fill time estimation may be adaptively corrected in accordance with the teachings of the above-referenced Downs et al. patent so as to compensate for vehicle variability, age and wear. The adaptive corrections are determined by measuring the time interval between the start of fill and the turndown or reduction in turbine speed during each upshift, and comparing the measured interval (inertia phase delay, IPDELAY) to a reference desired delay, DESDELAY, to determine if the on-coming clutching device was properly filled at the estimated end-of-fill. If the estimated fill time Tfill is correct, the on-coming clutch be properly filled at the estimated end-of-fill, and the measured IPDELAY will be substantially equal to the reference, DESDELAY.

Figure 3:
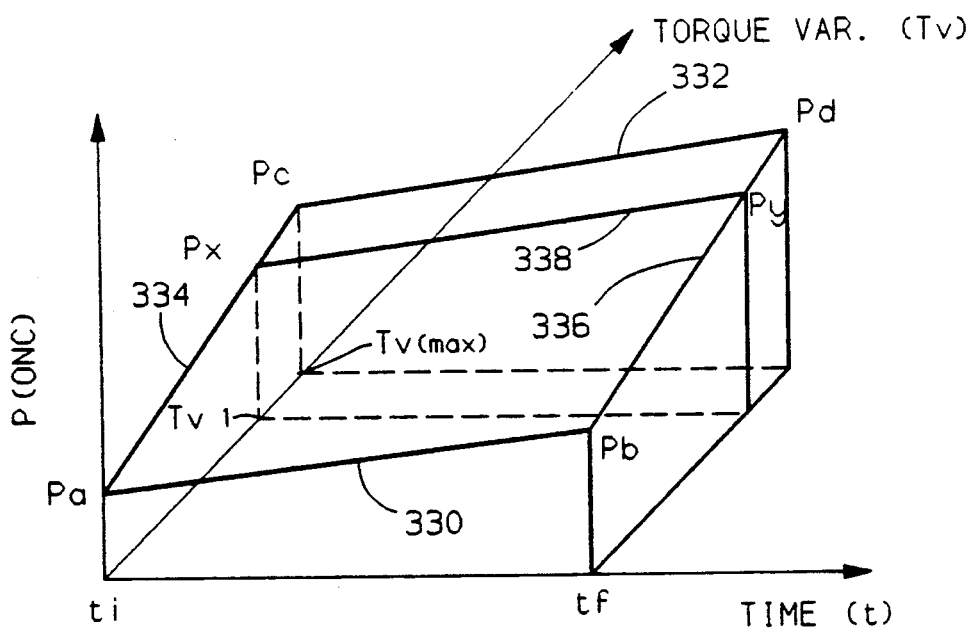
FIG. 3 graphically depicts the scheduled open-loop on-coming pressure command for a 2-3 upshift of the transmission depicted in FIGS. 1a–1b.

If the stored fill time Tfill is too short and the on-coming clutch is underfilled at the calculated end of fill, the turbine speed turndown will be late as shown in FIG. 3 of the above-referenced Downs et al. patent, and IPDELAY will be significantly greater than DESDELAY. In this event, the control unit 270 develops an adaptive fill time correction which increases the fill time Tfill for the respective clutch so that subsequent shifts involving that clutch will be performed in a more nearly optimum manner.

Figure 4:
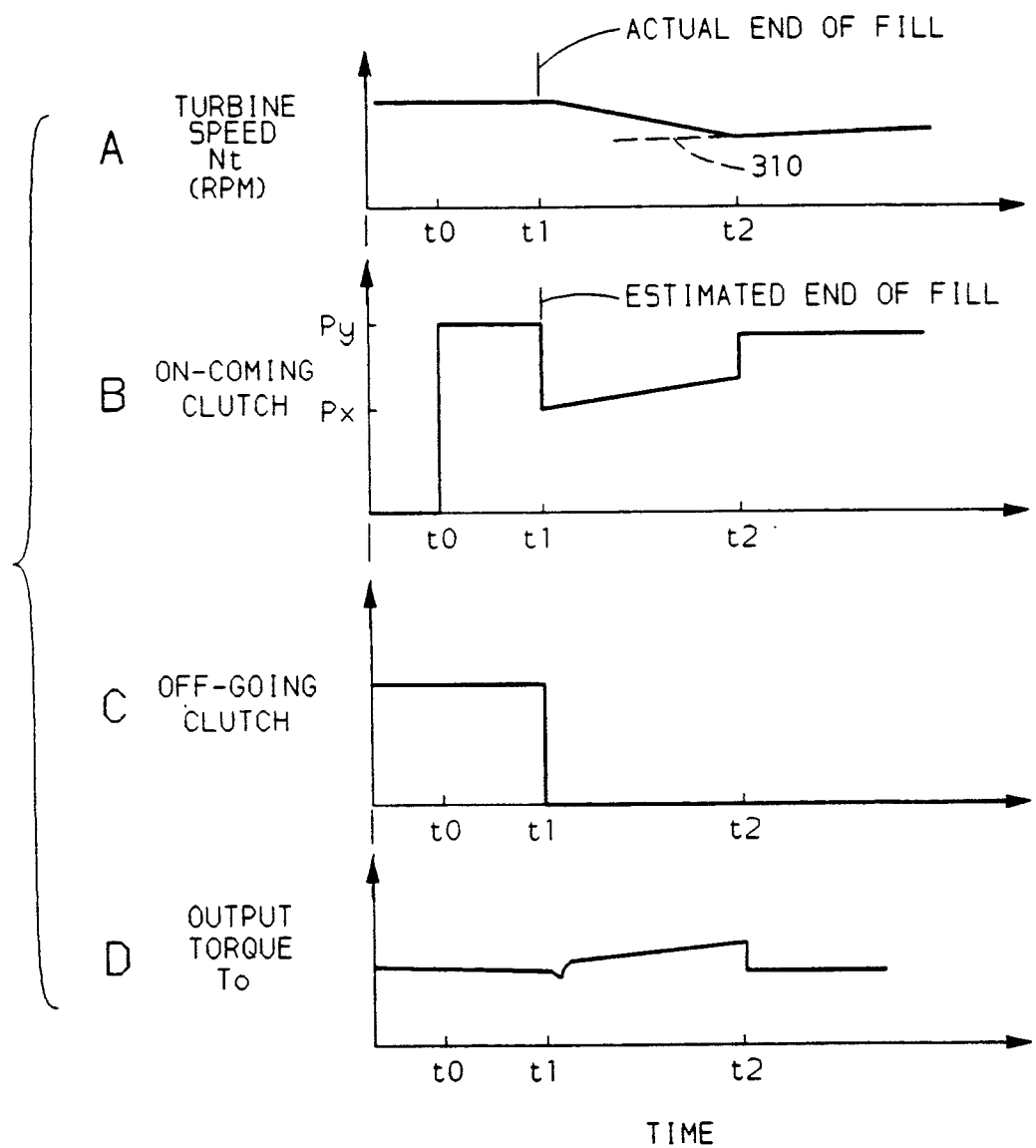
FIGS. 4–7 graphically depict various control parameters occurring during the course of a power-on upshift.

If the stored fill time Tfill is too long and the on-coming clutch is overfilled (already developing torque capacity) at the calculated end of fill, the resulting bind-up and momentary turbine speed reduction described in reference to FIG. 4 of the above-referenced Downs et al. patent will be sensed as an early turbine speed turndown, and IPDELAY will be significantly less than DESDELAY In this event, the control unit 270 develops an adaptive fill time correction which decreases the fill time Tfill for the respective clutching device so that subsequent shifts involving that clutching device will be carried out in a more nearly optimum manner.

Details of suitable techniques concerning the scheduling and application of fill time correction values are set forth in the above-referenced Downs et al. patent.

Following the fill phase, the torque and inertia phase pressure is scheduled in relation to an estimation of the gear set input torque Tv. The input torque Tv may be calculated as a function of the engine manifold absolute pressure (MAP), the engine pumping efficiency (K), a mechanical friction term (tf), the accessory load torque (TL), and the torque multiplication ratio (Tc) of the torque converter 24 according to the following expression:

$$Tv = [(MAP \times K) - tf - TL] \times Tc$$

The engine MAP is determined from the sensor 296, while the efficiency K is stored based on previously determined data. The mechanical friction term tf is determined as a function of engine speed, and the load torque term TL is estimated by loading indicators. The torque multiplication ratio Tc is determined as a function of the speed ratio Nt/Ne.

In practice, the desired pressure for the on-coming clutch is stored as a function of the torque variable Tv and time, as graphically depicted in FIG. 3. For any given value of torque variable Tv, the pressure vs. time schedule is defined by a pair of pressure endpoints, one such endpoint corresponding to an initial time ti, and the other corresponding to a final time tf. The time ti marks the beginning of the torque phase, and the time tf marks the end of the inertia phase. If the calculated torque variable Tv is zero or near-zero, for example, the pressure vs. time schedule is defined by the line 330 connecting the pressure endpoints Pa and Pb.

If the calculated torque variable Tv is very high, as designated by Tv(max), the pressure vs. time schedule is defined by the line 332 connecting the pressure endpoints Pc and Pd. In practice, only the four pressure endpoints Pa, Pb, Pc, and Pd need be stored by the control unit 270. For any calculated torque variable value Tv1 between zero and Tv(max), the initial pressure Px is linearly interpolated along the line 334 connecting the initial pressure endpoints Pa and Pc, and the final pressure Py is linearly interpolated along the line 336 connecting the final pressure endpoints Pb and Pd. In such case, the pressure vs. time schedule for the shift would be defined by the line 338 connecting the initial and final pressures Px and Py. The time (tf−ti) for a given shift is empirically derived and stored in the memory of control unit 270.

The scheduled on-coming pressure for the torque and inertia phases may also be adaptively corrected for error due to variability, wear, age, etc., in accordance with the teachings of the U.S. Patent to Downs et al. U.S. Pat. No. 4,653,350, issued on Mar. 31, 1987, and assigned to General Motors Corporation.

The scheduled on-coming pressure for the entire shift is typically developed by the pressure regulator valve PRV 68 by energizing the solenoid coil 246 of fluid valve 180 at a suitable PWM duty cycle while maintaining the fluid valve 182-190 for the on-coming clutch in an open state (100% duty cycle). The off-going pressure, in turn, is typically generated by energizing the respective fluid valve 182-190 to modulate the PRV pressure.

Figure 5:
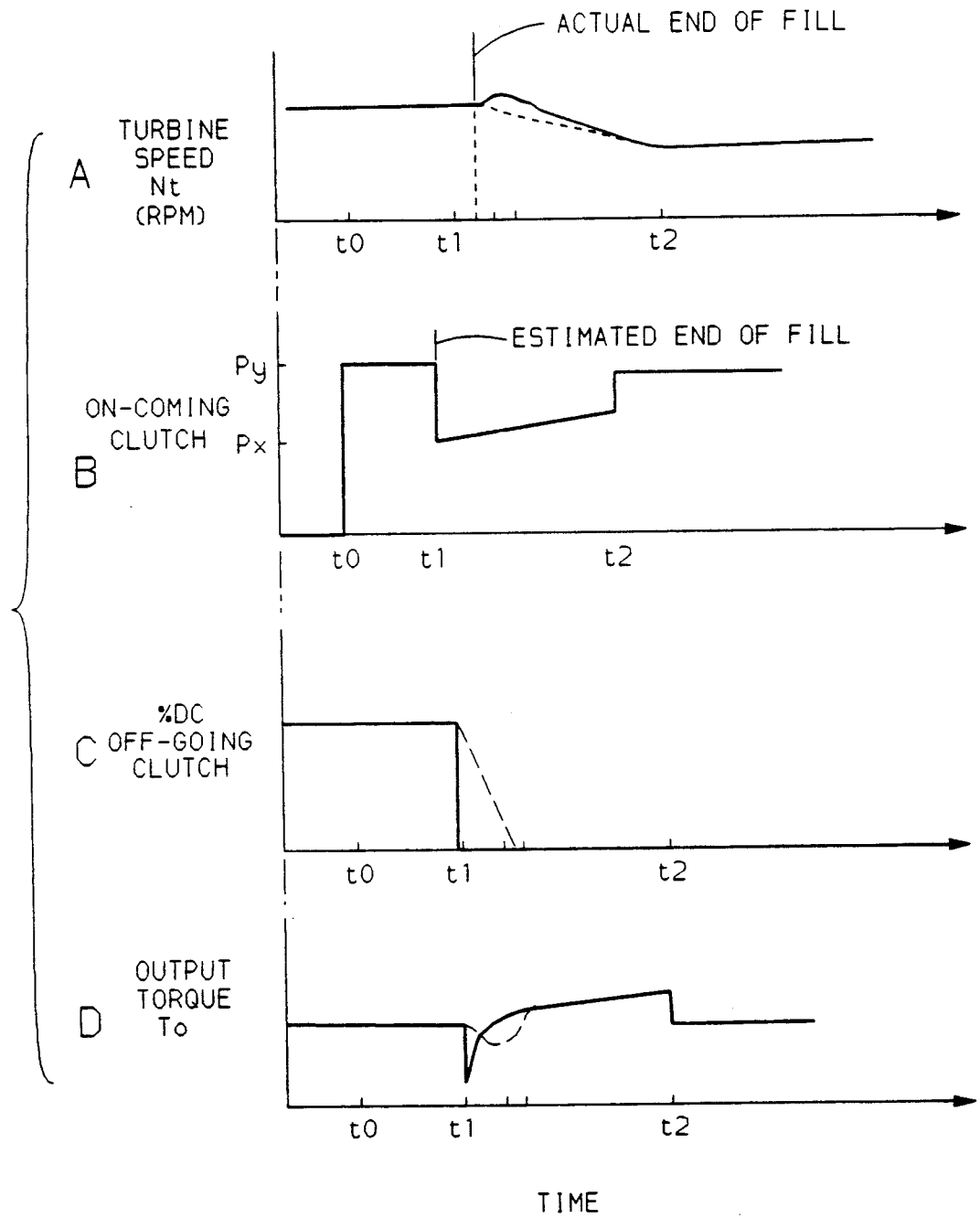

FIGS. 4 and 5, Graphs A-D, depict an upshift performed in accordance with the above-described controls—that is, with an estimated fill time and substantially no overlap between the off-going and on-coming clutches. In each Figure, Graph A depicts the turbine speed Nt, Graph B depicts the on-coming clutch pressure command P(ONC), Graph C depicts the off-going clutch pressure command P(OFG), and Graph D depicts the transmission output torque To, on a common time scale. The graphs of FIG. 4 represent a shift performed with accurate estimation of the on-coming clutch fill time Tfill, while the graphs of FIG. 5 represent a shift performed with underestimation of the fill time Tfill.

In both FIGS. 4 and 5, the fill phase of the shift is initiated at time t0 by applying a maximum pressure command to the on-coming clutch (Graph B) for a predetermined fill time Tfill determined, as described above in reference to FIG. 2. At the estimated end-of-fill time t1, the off-going clutch is released (Graph C) and the on-coming pressure command is reduced to a first predetermined value Px. The on-coming pressure P(ONC) is then progressively increased over the interval t1–t2 to a second predetermined value Py, the values Px and Py being determined by table look-up, as described above in reference to FIG. 3. Shortly after the actual end of fill, the turbine speed begins to fall toward a post shift value designated by the trace 310 in Graph A.

In the shift of FIG. 4, the actual end of fill (Graph A) coincides with the estimated end of fill (Graph B) due to the accurate fill time estimation, resulting in a brief torque phase and a nearly imperceptible output torque disturbance (Graph D). In FIG. 5, however, the actual end of fill (Graph A) occurs somewhat later than the estimated end of fill (Graph B) due to the fill time under-estimation, resulting in engine flare (Graph A), a prolonged torque phase and a more severe output torque disturbance (Graph D).

As illustrated by FIGS. 4 and 5, the exchange of off-going and on-coming clutches with substantially no overlap provides a high quality shift only when the controller accurately estimates the fill time Tfill of the on-coming clutch. In other words, the no overlap method is relatively intolerant to fill time estimation error.

As indicated above, the more conventional shift control method involving a progressive release of the off-going clutch, overlapping the on-coming clutch engagement, is relatively tolerant to fill estimation error, albeit with somewhat reduced shift quality, compared to a well timed quick release of the off-going clutch. A progressive off-going clutch release and the resulting turbine speed and transmission output torque are depicted by the broken traces in Graphs C, A and D, respectively, of FIG. 5. As indicated in Graphs A and D, engine flare is substantially eliminated and the torque disturbance is significantly abated, compared to the poorly timed off-going release method.

The control method of this invention controls the amount of clutch overlap in relation to an estimation of the ability or confidence of the control unit 270 with respect to accurate determination of the on-coming clutch fill time. When the level of confidence is low, the shift is carried out with a relatively large amount of clutch overlap as depicted by the broken traces of FIG. 5 to maximize the tolerance to fill estimation errors. As the confidence level increases, the amount of clutch overlap is progressively reduced, thereby improving the shift quality in relation to the ability of the control unit to accurately determine the fill time. When the confidence level is high, the shift is carried out with little or no overlap, as depicted in FIG. 4.

In the preferred embodiment, the on-coming clutch pressure is determined from a predetermined pressure schedule as described above, and the clutch overlap control is carried out by regulating the release rate of the off-going clutch. When the confidence level is relatively low, the release rate is relatively slow. When the confidence level is relatively high, the release rate is relatively fast. Significantly, this method permits continued observability of the parameters discussed above in reference to the determination of fill time error. Consequently, the adaptive fill time correction process can be used at any confidence level, hastening the transition from low confidence to high confidence.

In the illustrated embodiment, the off-going clutch release rate control is carried out by issuing a series of diminishing magnitude pressure commands to the off-going clutch following the estimated end-of-fill. Specifically, the control unit 270 issues a series of five (5) pressure command pulses, the magnitude of the various pulses being scheduled as an open-loop function of the confidence level. Zero magnitude commands may be issued to reduce the number of pulses as well.

Figure 6:
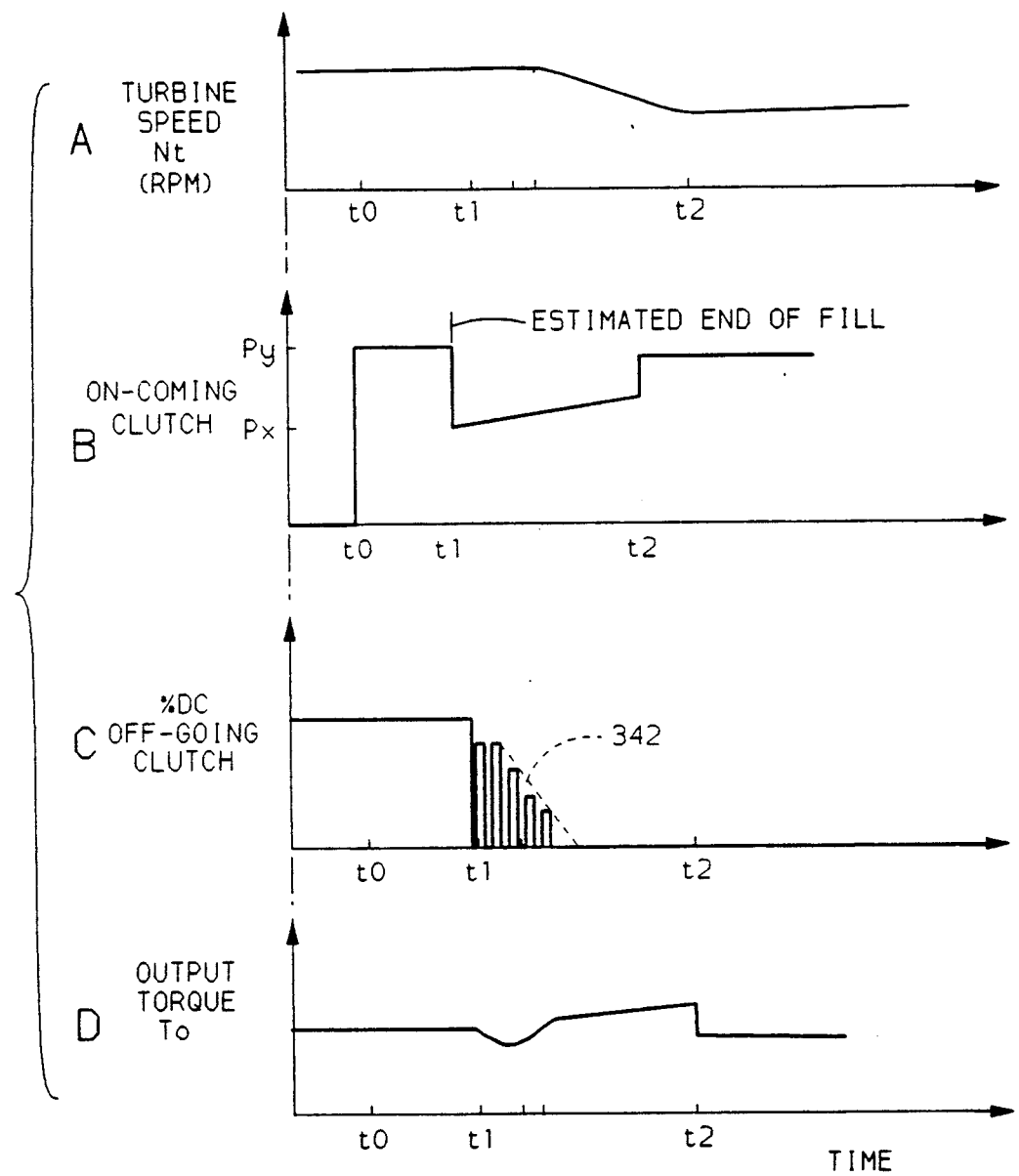
Figure 7:
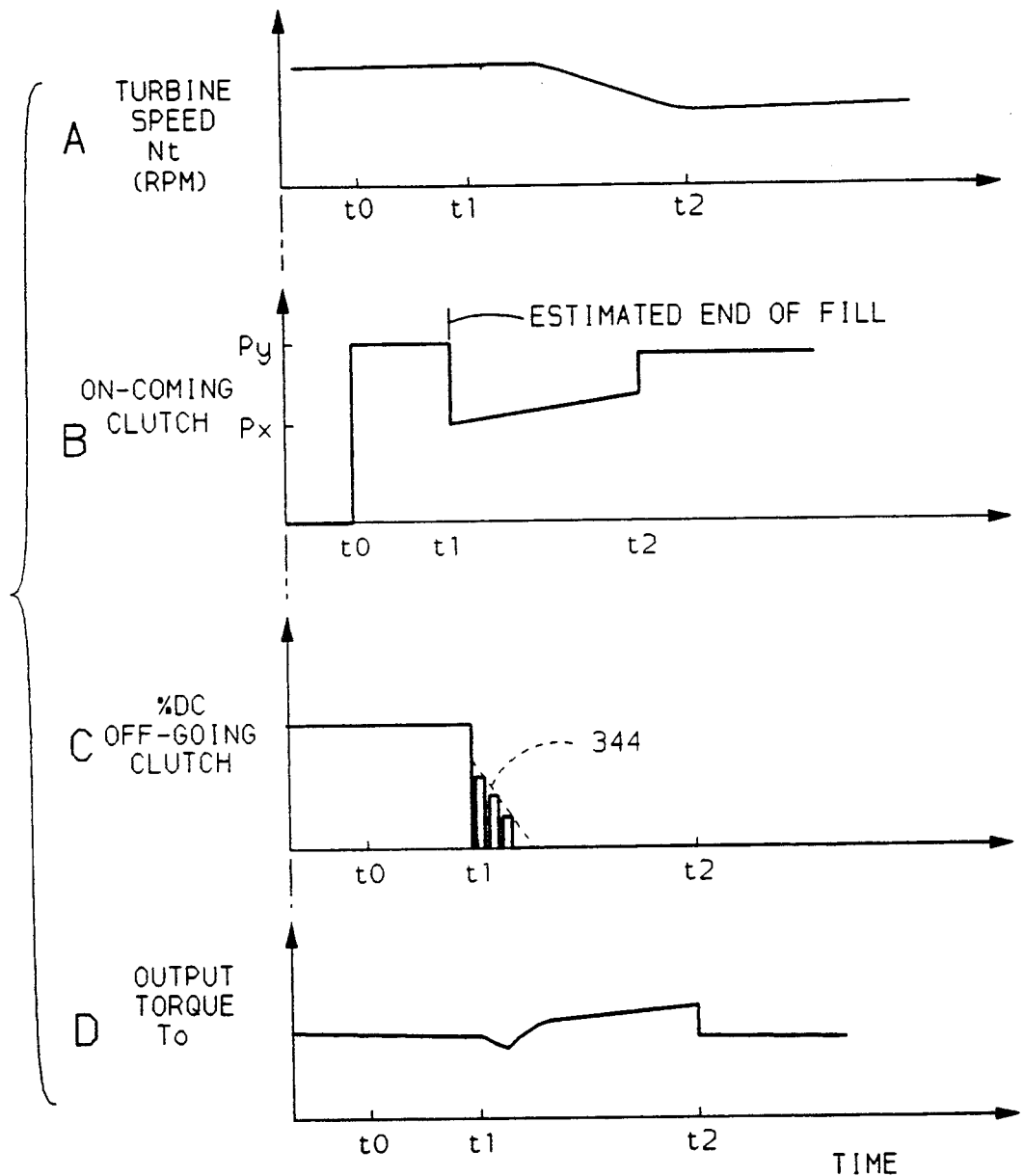

The off-going pulse technique is illustrated in Graphs A-D of FIG. 6 and 7, where Graph A depicts the turbine speed Nt, Graph B depicts the on-coming clutch pressure command P(ONC), Graph C depicts the off-going clutch pressure command P(OFG), and Graph D depicts the transmission output torque To, on a common time scale. The shift of FIG. 6 is performed at a relatively low confidence level, while the shift of FIG. 7 is performed at a relatively high confidence levels.

Referring to the low confidence shift of FIG. 6, the control unit 270 issues a series of five (5) diminishing, but relatively high magnitude off-going pressure command pulses, beginning shortly after the estimated end-of-fill. This results in a relatively large amount of overlap (Graphs B and C), no engine flare (Graph A), and a somewhat prolonged, but rounded output torque disturbance (Graph D), similar to that depicted by the broken trace 340 in Graph D of FIG. 5.

In the relatively high confidence shift of FIG. 7, the control unit 270 issues a series of three (3) diminishing, relatively low magnitude off-going pressure command pulses shortly after the estimated end of fill. This results in a relatively small amount of overlap (Graphs B and C), and a shortened, less severe output torque disturbance (Graph D), compared to the low confidence shift of FIG. 6.

Figure 8:
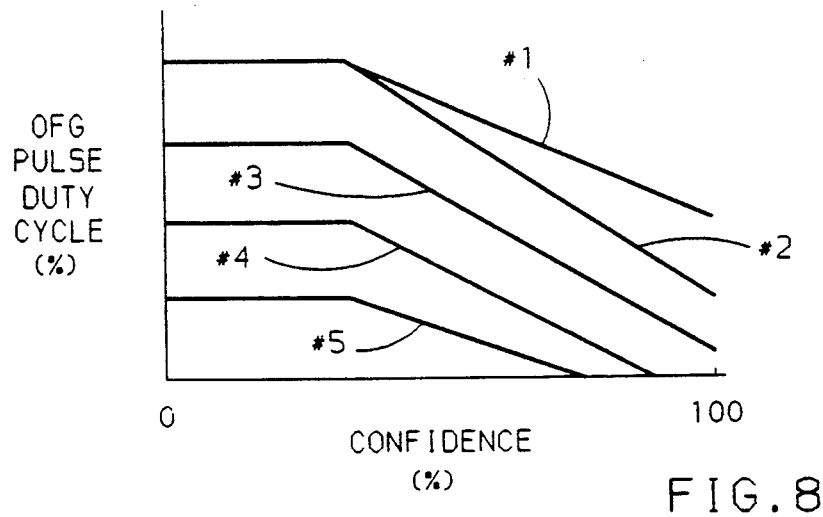
FIGS. 8 and 9 graphically depict alternate approaches for scheduling the off-going clutch release rate in relation to the estimated level of control confidence.

A graphical representation of a table look-up for the off-going pulse magnitudes is depicted in FIG. 8. In that Figure, the traces designated as #1, #2, #3, #4 and #5 represent the off-going clutch duty cycle commands for the first, second, third, fourth and fifth pulses, respectively. As indicated, the pulse duty cycles,,and thus the pressure command magnitudes, are scheduled as a function of the estimated confidence level. The confidence level is represented over a range of 0%-100%, 0% indicating lowest confidence, and 100% indicating highest confidence.

Figure 9:
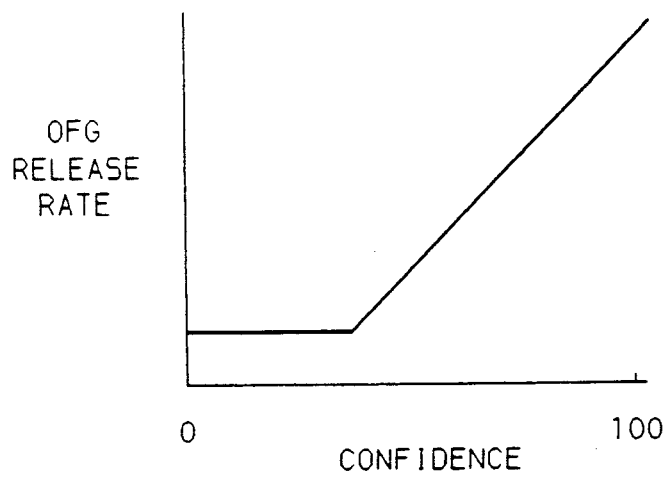

Alternatively, the control strategy of this invention may be carried out with a smooth reduction in the off-going pressure command, as indicated by the broken envelope traces 342 and 344 in Graph C of FIGS. 6 and 7, respectively. A possible table look-up for this approach is graphically depicted in FIG. 9, where the off-going release rate is given as a function of the estimated confidence level.

The control unit 270 determines and maintains separate confidence indicators for the 2-3 and 3-4 upshifts. In each case, the confidence term comprises three components: a temperature-based (TEMP) component, a first-time-fill-and-foam (FTFF) component and a fill error integrator (INT) component.

Figure 10:
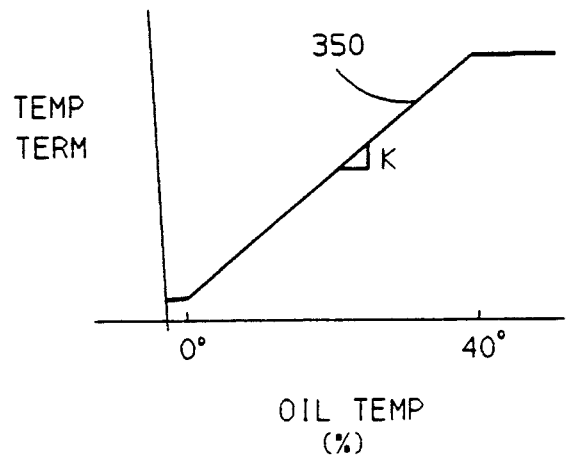
FIG. 10 graphically depicts a temperature term utilized to determine the level of control confidence according to this invention.

The temperature-based component is computed according to the product of the transmission sump oil temperature (OIL TEMP), as measured by the sensor 298 of FIG. 1a, and a scaling factor K1. This component applies equally to both confidence terms, and ensures that the confidence terms will be initiated at a low value under cold start conditions. Trace 350 of FIG. 10 graphically depicts the TEMP term as a function of the measured oil temperature, OIL TEMP, the scaling factor K1 corresponding to the slope of trace 350 over range of 0-40 degrees C.

The first-time-fill-and-foam (FTFF) component compensates for fluid drainage from the clutch feed lines during periods in which the respective clutch is not engaged by reducing the temperature-dependent confidence under such conditions. When a clutch in such condition is subsequently engaged, the fill time will be highly variable due to the presence of air in the feed lines. To reflect this effect into the confidence terms, the FTFF component operates to reduce the respective confidence term in relation to the time since such clutch was last released.

Figure 11:
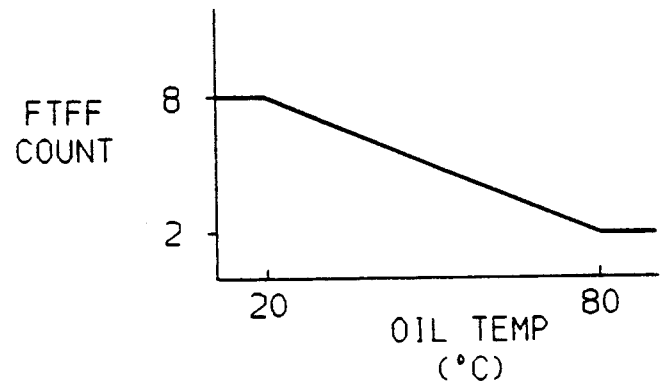
FIGS. 11 and 12 graphically depict parameters used in the development of a first time fill and foam (FTFF) term, also utilized to determine the level of control confidence according to this invention.

To account for inactive periods of the vehicle, a FTFF counter associated with each confidence term is initialized at an oil temperature dependent value at vehicle start-up. As indicated by the graphical representation of FIG. 11, the initialization values vary from eight counts at 20 degrees C. to two counts at 80 degrees C. according to the illustrated embodiment. This accounts for the fact that feed line air is purged more quickly with higher temperature transmission oil.

To account for clutch drainage during operation of the vehicle, the control unit 270 monitors the disengagement time of the 3rd and 4th clutches 32 and 34, and increments the respective FTFF counter if the disengagement time exceeds a reference time, REF1/REF2. Speed and oil temperature sensitivity is introduced into the timer function since the oil drainage occurs faster at high speeds and high oil temperatures.

Figure 12:
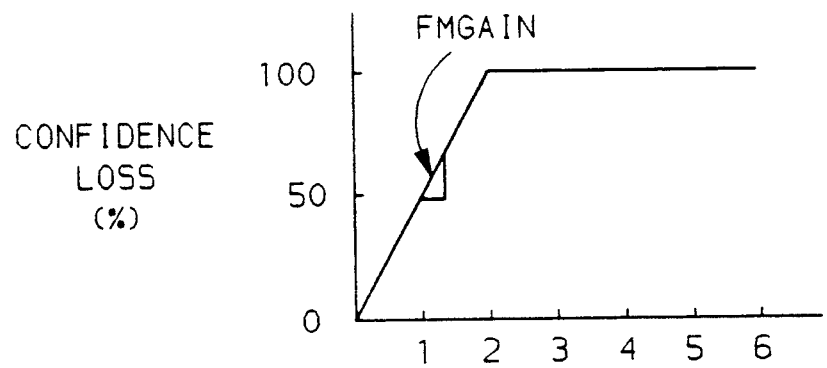

When applied to the temperature-dependent confidence term TEMP, the FTFF count is multiplied by a gain factor, FMGAIN, as graphically depicted in FIG. 12. The dependent variable is indicated as "CONFIDENCE LOSS" since the FTFF component subtracts from the temperature-dependent component TEMP.

The integrator term INT also subtracts from the temperature-dependent component TEMP, and is derived from the fill time error determination of the adaptive fill time correction routine described above. Integrator terms corresponding to the 3rd and 4th clutches 32 and 34 increase or decrease by an integral contribution with each 2-3 and 3-4 upshift, respectively, and their values when the vehicle ignition is turned off are stored in the keep-alive memory of control unit 270.

Figure 13:
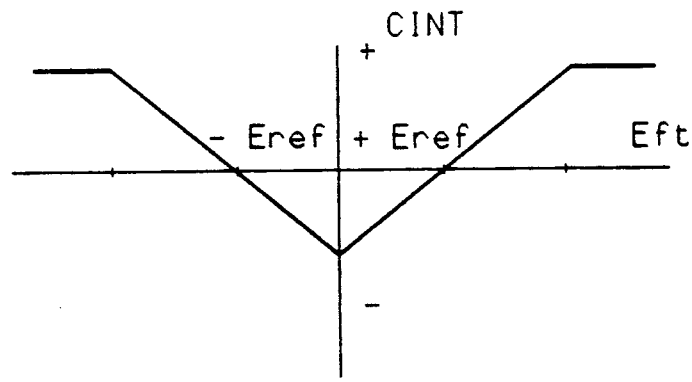
FIG. 13 graphically depicts an integrator term utilized to determine the level of control confidence according to this invention.

FIG. 13 graphically illustrates the integral contribution CINT as a function of fill time error Eft. For fill errors within an allowable range designated by ±Eft, the integral contribution is subtractive and inversely proportional to the error; for fill errors outside the allowable range, the integral contribution is additive and directly proportional to the error. If the keep-alive memory is lost or corrupted for any reason, or after any power interruption to control unit 270, the integrator terms are reset to a maximum value to ensure a low confidence indication.

Figure 14:
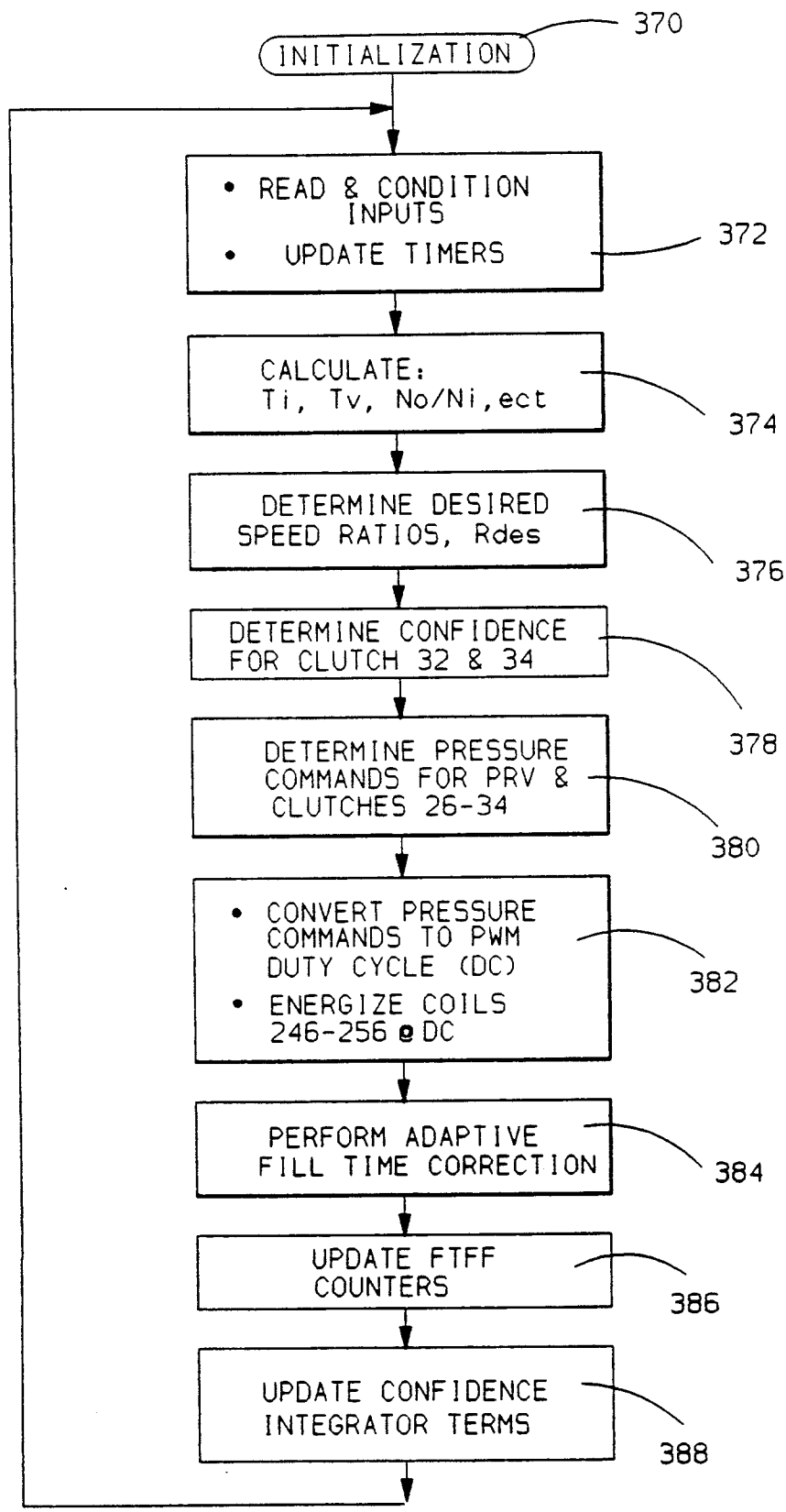
FIGS. 14-20 depict flow diagrams executed by the computer-based controller of FIG. 1a in carrying out the control of this invention.

The flow diagrams depicted in FIGS. 14–20 represent program instructions to be executed by the microcomputer 302 of control unit 270 in mechanizing ratio shifting and the control functions of this invention. The flow diagram of FIG. 14 represents a main or executive program which calls various subroutines for executing particular control functions as necessary. The flow diagrams of FIGS. 15–20 represent the functions performed by those subroutines which are pertinent to the present invention.

Referring now more particularly to FIG. 14, the reference numeral 370 designates a set of program instructions executed at the initiation of each period of vehicle operation for initializing the various tables, timers, etc., used in carrying out the control functions of this invention. Certain of the initialization steps pertaining to the control of this invention are set forth in the flow diagram of FIG. 15. Following such initialization, the instruction blocks 372–388 are repeatedly executed in sequence, as designated by the flow diagram lines connecting such instruction blocks.

Instruction block 372 reads and conditions the various input signals applied to I/O device 300 via the lines 272–285, and updates (increments) the control unit timers. Instruction block 374 calculates various terms used in the control algorithms, including the input torque Ti, the torque variable Tv, and the speed ratio No/Ni. Instruction block 376 determines the desired speed ratio, Rdes, in accordance with a number of inputs including throttle position, vehicle speed, and manual valve position. In transmission control, this function is generally referred to as shift pattern generation.

Figure 16:
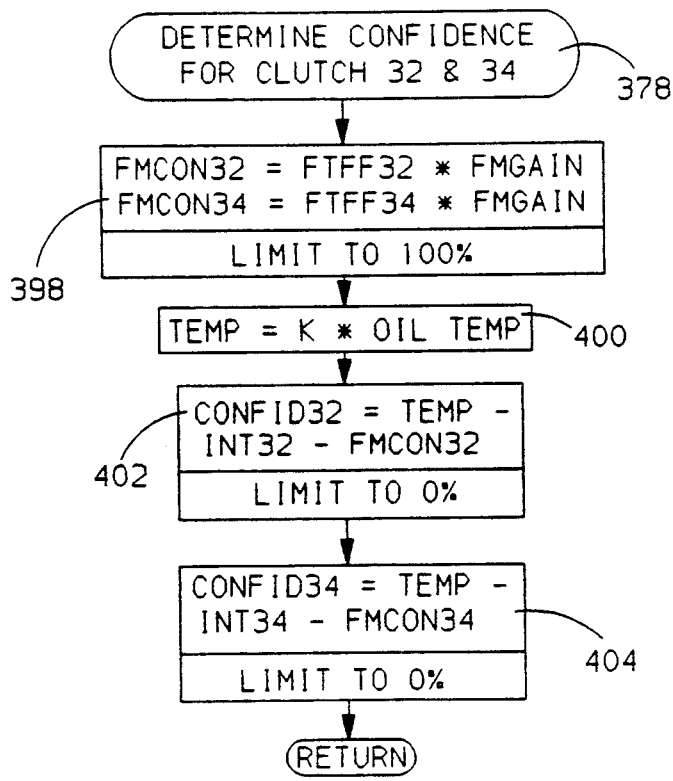

Instruction block 378 determines the confidence terms CONFID32 and CONFID34 for the 3rd and 4th clutches 32 and 34, respectively, and is set forth in further detail in the flow diagram of FIG. 16. Instruction block 380 determines the clutch pressure commands for effecting a ratio shift, if required. The pressure commands for the pressure regulator valve PRV and nonshifting clutching devices are also determined. An expanded description of the instruction block 380 is set forth below in reference to the flow diagrams of FIGS. 17–18.

Instruction block 382 converts the clutching device and PRV pressure commands to a PWM duty cycle based on the operating characteristics of the various actuators (empirically determined), and energizes the actuator coils accordingly. Instruction block 384 relates to the determination of adaptive corrections for the empirically derived clutch pressure schedules, and is set forth in detail in the above referenced U.S. Pat. No. 4,707,789 to Downs et al. Instruction block 386 updates the counters FTFF32 and FTFF34 for clutches 32 and 34, respectively, and is set forth in further detail in the flow diagram of FIG. 19. Instruction block 388 updates the integrator terms INT32 and INT34 for clutches 32 and 34, respectively, and is set forth in further detail in the flow diagram of FIG. 20.

Figure 15:
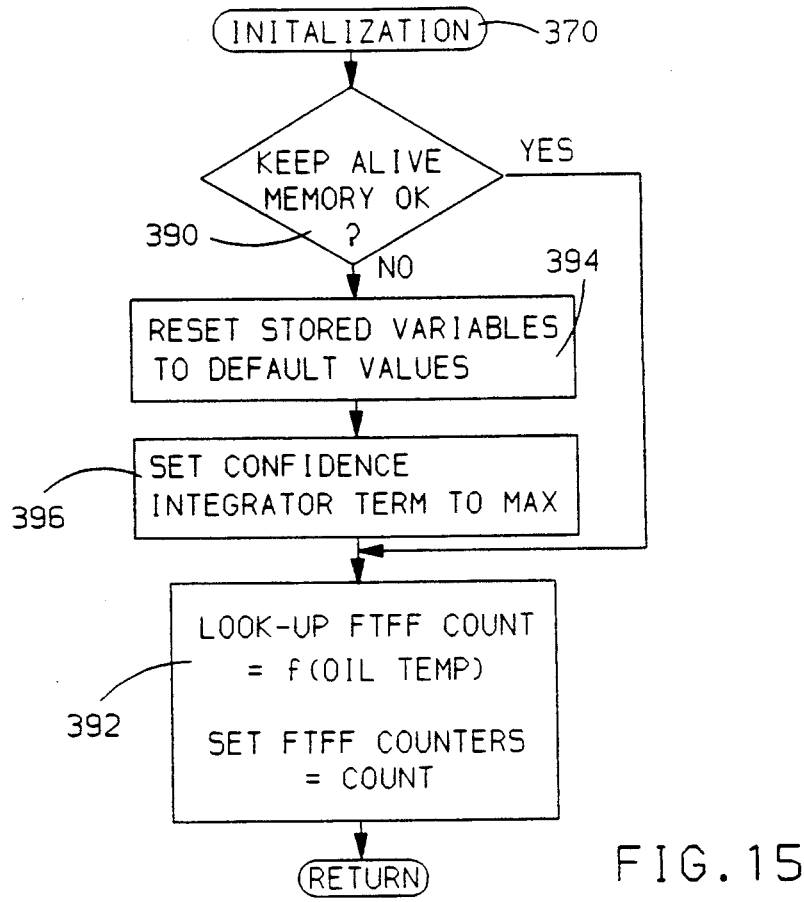

Referring to the INITIALIZATION routine steps of FIG. 15, the decision block 390 is first executed to determine if the keep-alive memory of control unit 270 is intact. As indicated above, the keep-alive memory is maintained between operating periods of the vehicle by a very low quiescent current supplied from the vehicle electrical system. If the vehicle battery is disconnected from the system, or a new controller or transmission is installed, or if a memory failure occurs, the block 390 will be answered in the negative. If the keep-alive memory is intact, the block 392 is executed to look-up an oil temperature dependent initial counter value, as described above in reference to FIG. 11, and to store that count in both counters FTFF32 and FTFF34. If decision block 390 is answered in the negative, the blocks 394 and 396 are additionally executed to reset certain stored variables to a default setting stored in nonvolatile memory, and to set the confidence integrator terms INT32 and INT34 to a maximum value.

Referring to the confidence determination flow diagram of FIG. 16, the block 398 is first executed to compute the FTFF confidence components FMCON32 and FMCON34 for clutches 32 and 34, respectively. This involves applying a gain term FMGAIN to the FTFF counter values FTFF32 and FTFF34, as described above in reference to FIG. 12. The confidence components FMCON32 and FMCON34 are limited to 100%, as indicated at block 398. The instruction block 400 is then executed to compute the oil temperature-based component TEMP, as described above in reference to FIG. 10. The instruction blocks 402 and 404 are then executed to compute the confidence terms CONFID32 and CONFID34 for clutches 32 and 34, respectively, according to the expressions:

$$CONFID32 = TEMP - INT32 - FMCON32, \text{ and}$$

$$CONFID34 = TEMP - INT34 - FMCON34.$$

The confidence terms CONFID32 and CONFID34 are limited to 0% as indicated.

Figure 17:
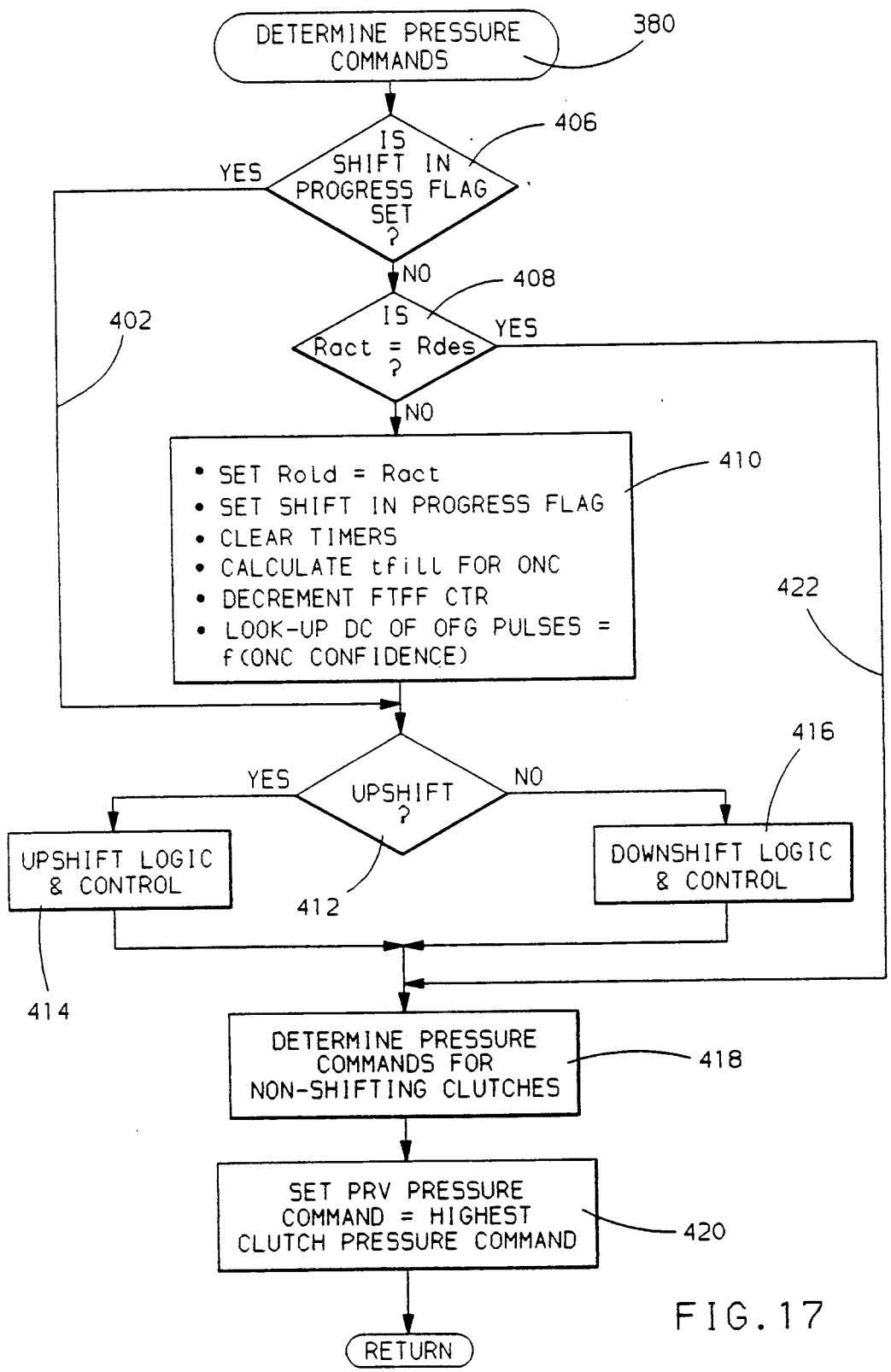
Figure 18:
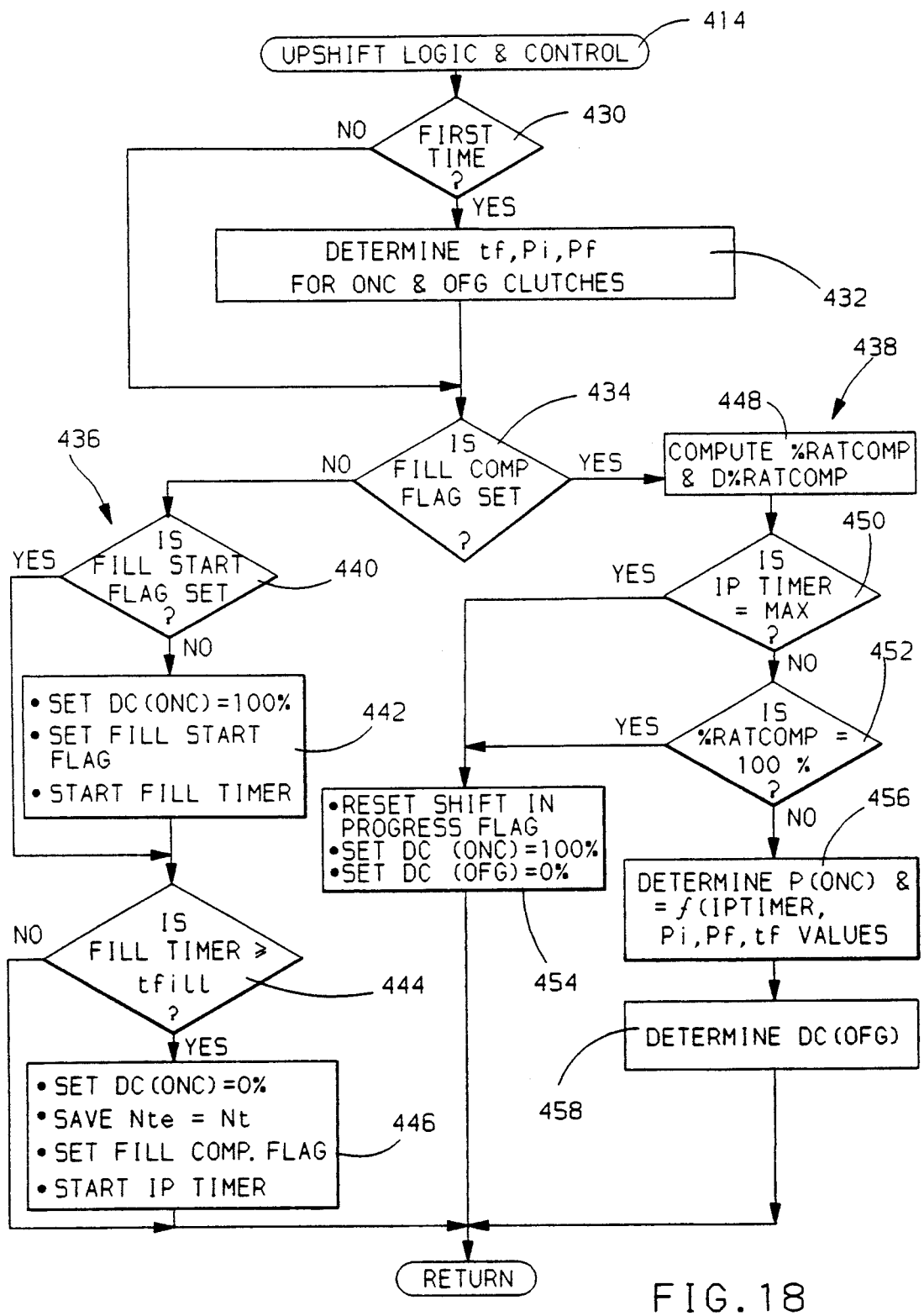

As indicated above, the flow diagrams of FIGS. 17–18 set forth the clutch and PRV pressure determination algorithm generally referred to at the main loop instruction block 380 of FIG. 14. Referring to FIG. 17, the blocks 406–410 are first executed to set up initial conditions if a shift is desired If a shift is desired, the blocks 412–416 are executed to develop pressure commands for the clutching devices involved in the shift. Thereafter, the instruction blocks 418–420 are executed to develop pressure commands for the nonshifting clutches and the pressure regulator valve PRV, completing the routine. As indicated at instruction block 420, the pressure command for the regulator valve PRV is set equal to the highest of the pressure commands for the various clutching devices.

The decision block 406 determines if a shift is in progress as indicated by the "SHIFT IN PROGRESS" flag. The decision block 408 determines if the actual speed ratio Ract (that is, No/Nt) is equal to the desired speed ratio Rdes determined at instruction block 376 of FIG. 14. The instruction block 410 is only executed when decision blocks 406 and 408 are both answered in the negative. In such case, instruction block 410 serves to (1) set the old ratio variable, Rold, equal to Ract, (2) set the "SHIFT IN PROGRESS" flag, (3) clear the shift timers, (4) calculate fill time Tfill for the on-coming clutch, (5) decrement the FTFF counter, and (6) look-up the off-going pulse duty cycle commands (or alternately, the off-going release rate) as a function of the confidence term for the on-coming clutch. If a shift is in progress, the execution of blocks 408 and 410 is skipped. If no shift is in progress, and the actual ratio equals the desired ratio, the execution of blocks 410–416 is skipped, as indicated by the flow diagram line 422.

The blocks 412–416 determine if the shift is an upshift or a downshift, and develop appropriate pressure commands for the active (shifting) clutches. To illustrate how such pressure commands are developed, the steps involved in the development of a typical power-on upshift (i.e., instruction block 414) are set forth in the flow diagram of FIG. 18.

On entering the flow diagram of FIG. 18, the control unit 270 executes a shift initializing routine comprising the blocks 430 and 432. In the first execution of the routine in a given shift, determined by the decision block 430, the instruction block 432 is executed to determine the pressure parameters Pi, Pf and tf for the on-coming (ONC) and off-going (OFG) clutches. In subsequent executions of the routine, decision block 430 is answered in the negative.

Decision block 434 is then executed to determine if the fill phase of the shift is completed, as indicated by the "FILL COMP" flag. If not, the flow diagram branch, generally designated by the reference numeral 436, is executed; if so, the flow diagram branch, generally designated by the reference numeral 438, is executed.

The flow diagram branch 436 includes a fill initializing routine comprising the blocks 440 and 442 and a fill completion routine comprising the blocks 444 and 446. At the beginning of each shift, the "FILL COMP" flag is not set, and the decision block 440 of the fill initializing routine is executed to determine if the fill phase has started, as indicated by the "FILL START" flag. Initially, the "FILL START" flag is not set, and instruction block 442 is executed to set the energization duty cycle of the on-coming clutch, DC(ONC), equal to 100%, to set the "FILL START" flag, and to start a FILL TIMER. Thereafter, decision block 440 is answered in the affirmative, and execution of instruction block 442 is skipped.

Decision block 444 of the fill completion routine determines if the count in FILL TIMER is greater than or equal to the fill time Tfill determined at instruction block 414 of FIG. 17. If so, instruction block 446 is executed to save the entry turbine speed Nte, to set the "FILL COMP" flag, and to start the inertia phase timer, IP TIMER. If decision block 444 is answered in the negative, the fill phase is incomplete, and execution of the instruction block 446 is skipped.

After the fill period has elapsed and decision block 434 is answered in the affirmative, the flow diagram branch 438 is executed to complete the shift. First, the instruction block 448 is executed to calculate the value of %RATCOMP. Then the decision blocks 450 and 452 are executed to determine if the count in IP TIMER is at a maximum value, MAX, or if the term %RATCOMP is substantially equal to 100%. If either of the decision blocks 450 or 452 are answered in the affirmative, the shift is complete and instruction block 454 is executed to reset the "SHIFT IN PROGRESS" flag, to set the on-coming duty cycle, DC(ONC), equal to 100%, and to set the off-going duty cycle, DC(OFG), equal to 0%. If both decision blocks 450 and 452 are answered in the negative, instruction blocks 456 and 458 are executed to determine the on-coming pressure command P(ONC) and the off-going duty cycle DC(OFG), taking into account the adaptive pressure correction, if any, for the on-coming pressure P(ONC). The base on-coming pressure is determined from a table look-up as described above in reference to FIG. 3, while the off-going duty cycle is determined at the above-described block 414 of FIG. 17.

Figure 19:
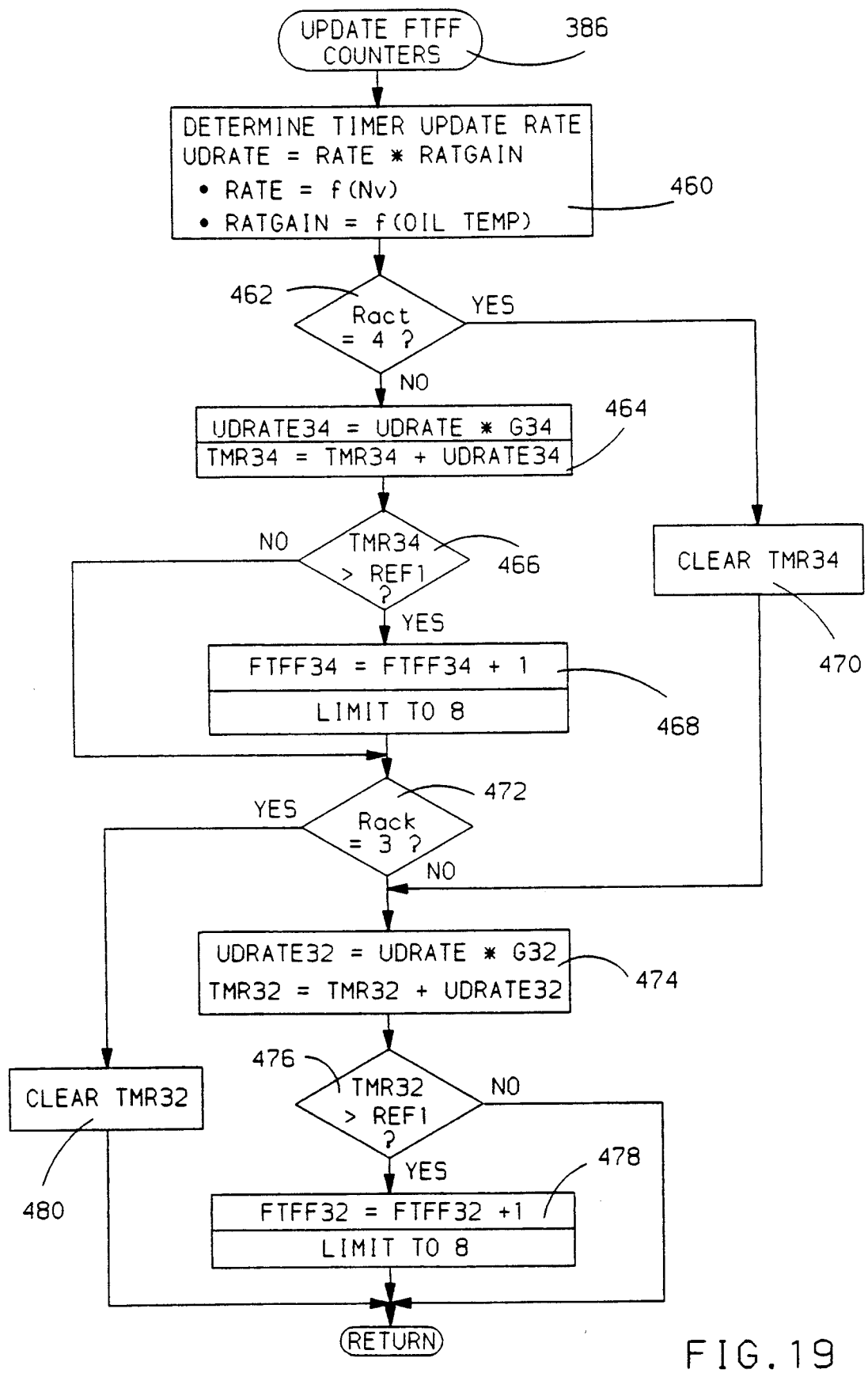

Referring to the UPDATE FTFF COUNTERS flow diagram of FIG. 19, the instruction block 460 is first executed to determine the timer update rate according to the product of a speed-dependent rate term, RATE and an oil temperature-dependent gain term, RATGAIN. If the actual ratio Ract is other than 4th, as determined at block 462, the blocks 464–468 are executed to update the FTFF34, the FTFF counter for the 4th clutch 34. The timer for the clutch 34, TMR34, is updated by an update rate term, UDRATE34, which in turn, is determined according to the product of the update rate UDRATE and a gain term G34 specific to the clutch 34. When the count of TMR34 exceeds a reference REF1, as determined at block 466, the block 468 is executed to increment the counter FTFF34, limited to a maximum value of eight (8), and to clear the timer TMR34.

If the actual ratio is 4th (as determined at block 462), the block 470 is executed to clear the 4th clutch timer TMR34. In this case, or if the actual ratio is a different ratio other than 3rd (as determined at block 472), the blocks 474–478 are executed to update FTFF32, the FTFF counter for the 3rd clutch 32. The timer for the clutch 32, TMR32, is updated by an update rate term, UDRATE32, which in turn, is determined according to the product of the update rate UDRATE and a gain term G32 specific to the clutch 32. When the count of TMR32 exceeds a reference REF2, as determined at block 476, the block 478 is executed to increment the counter FTFF32, limited to a maximum value of eight (8), and to clear the timer TMR32. If the actual ratio is 3rd, (as determined at block 472), the block 480 is executed to clear the 3rd clutch timer TMR32.

Figure 20:
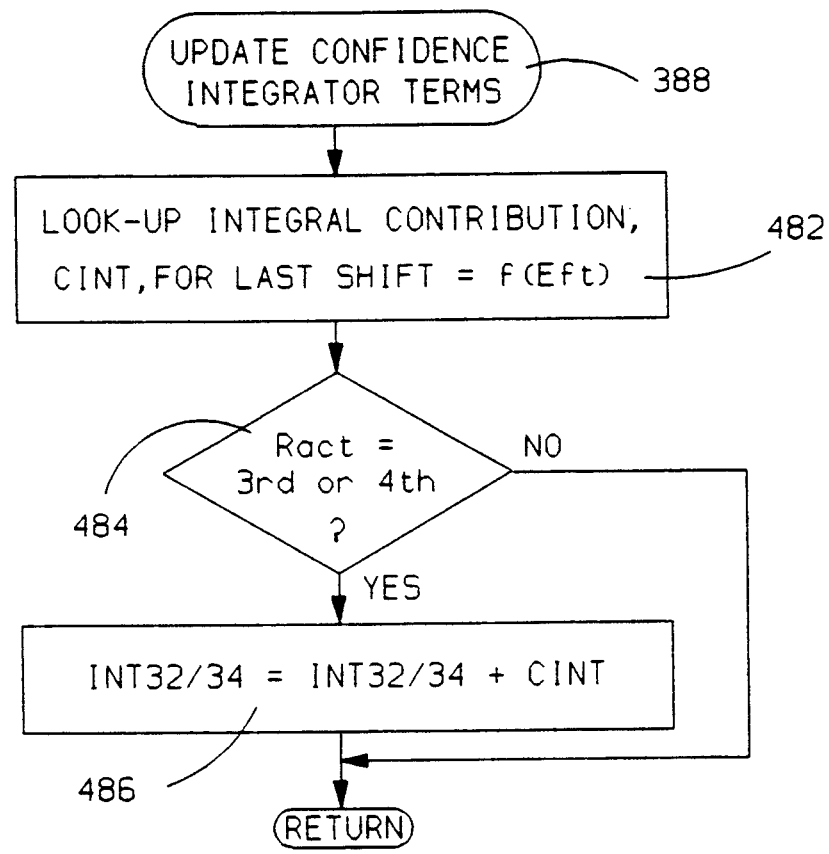

Referring to the flow diagram of FIG. 20, the blocks 482–486, executed after each upshift, update the integrator term INT32 and INT34 for the 3rd and 4th clutches 32 and 34, respectively. The block 482 is first executed to look-up the integral contribution CINT for the subject shift in relation to the fill time error Eft as discussed above in reference to the graph of FIG. 13. As indicated by the blocks 484 and 486, the integral contribution CINT is applied to the integrator term INT32 if the actual ratio (post-shift) is 3rd, and to the integrator term INT34 if the actual ratio is 4th.

With the above-described control, open-loop clutch-to-clutch upshifting is carried out in an error tolerant way—that is, with relatively large clutch overlap—when the level of control confidence is deemed to be low. As the sensed level of control confidence increases, the degree of overlap is correspondingly reduced, thereby increasing the shift quality in relation to the ability of the control system to accurately estimate the on-coming clutch fill time.

While this invention has been described in reference to the illustrated embodiment, it will be understood that various modifications in addition to those discussed above will occur to those skilled in the art. In this regard, it will be understood that systems incorporating various modifications may fall within the scope of this invention which is defined by the appended claims.

The embodiments of the invention in which an exclusive property or privilege is claimed are defined as follows:

1. In an automatic shift motor vehicle transmission wherein shifting from a current speed ratio to a desired speed ratio is carried out by a control unit which releases a fluid operated off-going clutch associated with the current speed ratio and engages a fluid operated on-coming clutch associated with the desired speed ratio after filling the on-coming clutch in preparation for such engagement by supplying fluid thereto for an estimated fill time, a method of operation which accounts for variability of the time required to fill said on-coming clutch comprising the steps of:
   determining a confidence indication representing a judgment, based on current operating conditions of the transmission, of the ability of the control unit to accurately estimate the time required to fill the on-coming clutch; and
   controlling a rate of release of the off-going clutch following said estimated fill time based on said confidence indication so as to control an amount of time overlap between engagement of said on-coming clutch and release of said off-going clutch, the amount of such overlap progressively decreasing with increases in the judged ability of the control unit to accurately estimate the time required to fill said on-coming clutch.

2. The method of operation as set forth in claim 1, wherein the confidence indication is determined as a function of a temperature measurement of said fluid, the confidence indication thereby serving to decrease said overlap with increases in said temperature measurement.

3. The method of operation as set forth in claim 1, wherein the confidence indication is determined in relation to a measure of the time since the on-coming clutch was previously engaged, the confidence indication thereby serving to increase said overlap with increases in such time measurement.

4. The method of operation set forth in claim 3, wherein said time measurement is adjusted based on a temperature measurement of said fluid so as to increase the time measurement with increases in such temperature measurement.

5. The method of operation set forth in claim 3, wherein said time measurement is adjusted based on a transmission speed measurement so as to increase the time measurement with increases in said speed measurement.

6. The method of operation set forth in claim 3, wherein said time measurement is initialized at an initiation of vehicle operation at an amount based on a temperature measurement of said fluid.

7. A method of operation as set forth in claim 1, including the steps of:
   an adaptive correction amount for said estimated fill time based on a measured deviation between actual and desired operating parameters in a previous shift to said desired speed ratio; and
   adjusting said confidence indication by an integrator term determined in relation to said measured deviation so as to increase said overlap when the measured deviation exceeds a threshold, and to decrease said overlap when the measured deviation is less than said threshold.

8. The method of operation set forth in claim 7, including the steps of:
   storing said adaptive correction amount in a control unit memory;
   setting said integrator term to a maximum value to provide increased overlap when a corruption of said control unit memory is detected.

9. In an automatic shift motor vehicle transmission wherein shifting from a current speed ratio to a desired speed ratio is carried out by a control unit which releases an off-going pressure supplied to a fluid operated off-going clutch associated with said current speed ratio and supplies an on-coming pressure to a fluid operated on-coming clutch associated with said desired speed ratio, a method of operation for said control unit for shifting from the current speed ratio to the desired speed ratio comprising the steps of:
   filling the on-coming clutch in preparation for engagement by supplying fluid pressure thereto for an estimated fill time, and thereafter, releasing said off-going pressure while supplying on-coming pressure to said on-coming clutch;
   determining a confidence indication representing a judgment, based on current operating conditions of the transmission, of the ability of the control unit to accurately estimate the time required to fill the on-coming clutch; and
   issuing a series of off-going pressure pulses following the release of said off-going pressure based on said confidence indication so as to control an amount of time overlap between engagement of said on-coming clutch and release of said off-going clutch, the amount of such overlap progressively decreasing with increases in the judged ability of the control unit to accurately estimate the time required to fill said on-coming clutch.

10. The method of operation set forth in claim 9, wherein said off-going pressure pulses have magnitudes determined in relation to said confidence indication for controlling the rate of release of said off-going clutch.

11. In an automatic shift motor vehicle transmission wherein shifting from a current speed ratio to a desired speed ratio is carried out by a control unit which releases a fluid operated off-going clutch associated with the current speed ratio and engages a fluid operated on-coming clutch associated with the desired speed ratio after filling the on-coming clutch in preparation for such engagement by supplying fluid thereto for an estimated fill time, a method of operation which accounts for variability of the time required to fill said on-coming clutch comprising the steps of:

determining a confidence indication representing a judgment, based on a temperature measurement of said transmission fluid, of the ability of the control unit to accurately estimate the time required to fill the on-coming clutch, such confidence indication having a value which increases with increasing judged ability and decreases with decreasing judged ability; and controlling a rate of release of the off-going clutch following said estimated fill time based on said confidence indication so as to control an amount of time overlap between engagement of said on-coming clutch and release of said off-going clutch, the amount of such overlap progressively decreasing with increases in the judged ability of the control unit to accurately estimate the time required to fill said on-coming clutch.

12. The method of operation set forth in claim 11, wherein the confidence indication is decreased by an amount determined in relation to a measure of the time since the on-coming clutch was previously engaged.

13. The method of operation set forth in claim 12, wherein said time measurement is initialized at an initiation of vehicle operation at an amount based on a temperature measurement of said fluid.

14. A method of operation as set forth in claim 11, including the steps of:

developing an adaptive correction amount for said estimated fill time based on a measured deviation between actual and desired operating parameters in a previous shift to said desired speed ratio;

decreasing said confidence indication when the measured deviation exceeds a threshold; and increasing said confidence indication when the measured deviation is less than said threshold.

* * * * *